Aug. 11, 1953

A. H. REDDING ET AL 2,648,193

ANTI-ICING APPARATUS HAVING MEANS TO CONTROL TEMPERATURE
AND PRESSURE OF THE HEATING GASES

Filed April 10, 1951

INVENTORS
Arnold H. Redding
Irvin R. Whiteman
William F. Thompson Jr.
BY
Ralph T. French
ATTORNEY Aug. 11, 1953 A. H. REDDING ET AL 2,648,193
ANTI-ICING APPARATUS HAVING MEANS TO CONTROL TEMPERATURE
AND PRESSURE OF THE HEATING GASES
Filed April 10, 1951 3 Sheets-Sheet 2

WITNESSES:

INVENTORS
Arnold H. Redding
Irvin R. Whiteman
William F. Thompson Jr
BY

ATTORNEY

Aug. 11, 1953　　　A. H. REDDING ET AL　　　2,648,193
ANTI-ICING APPARATUS HAVING MEANS TO CONTROL TEMPERATURE
AND PRESSURE OF THE HEATING GASES
Filed April 10, 1951　　　　　　　　　　　　　　　　　3 Sheets-Sheet 3

Shutoff

Transitory

Idle

Regulating

WITNESSES:
John M. Wright
V. W. Novak

INVENTORS
Arnold H. Redding
Irvin R. Whiteman
William F. Thompson Jr
BY
Ralph T. French
ATTORNEY Patented Aug. 11, 1953

2,648,193

UNITED STATES PATENT OFFICE 2,648,193

ANTI-ICING APPARATUS HAVING MEANS TO CONTROL TEMPERATURE AND PRESSURE OF THE HEATING GASES

Arnold H. Redding, Wallingford, Irvin R. Whiteman, Philadelphia, and William F. Thompson, Jr., Wallingford, Pa., assignors to Westinghouse Electric Corporation, East Pittsburgh, Pa., a corporation of Pennsylvania Application April 10, 1951, Serial No. 220,274

7 Claims. (Cl. 60—39.09)

This invention relates to gas-motivated power plants, and more particularly to means for preventing formation of ice on an aviation gas turbine power plant.

In the operation of an aviation gas turbine power plant at high altitudes, the casing structure forming the forwardly directed air intake opening for the power plant tends to accumulate a coating of ice, which may become sufficiently heavy to reduce the flow area of the intake opening and thus to jeopardize continuous supply of atmospheric air at the rate necessary to maintain efficient operation of the power plant. It has consequently been proposed to provide means for heating the casing surfaces adjacent the air intake opening by conducting hot gases from the combustion zone of the engine through suitably formed heating passages formed in the air intake portion of the casing structure. It is desirable, however, to ensure maintenance of favorable temperature and pressure of such heating gases, under the varying engine speed and pressure conditions encountered during flight at high altitudes.

It is an object of the present invention to provide an improved anti-icing system for an aviation engine, including means for effecting the supply of heating gases to a suitable conduit at controlled temperature and pressure, in accordance with varying engine temperature and pressure conditions incident to flight operation of the power plant.

Another object is to provide anti-icing apparatus utilizing heated gases as the circulating medium, and including automatic control means operative to supply a mixture of air from the compressor outlet and hot gas from the combustion apparatus to the anti-icing apparatus in proportions determined in accordance with temperature and pressure conditions in the power plant, for limiting undue energy losses therein due to operation of the anti-icing apparatus.

Another object of the invention is the provision of an anti-icing apparatus of the above description which will be operative to control flow of heating gases at a temperature not exceeding about 700° F., and which will limit the pressure of such gases to a preselected value, which may, for example, be approximately 15 p. s. i. gauge pressure.

A further object of the invention is to provide valve means automatically operative to control supply to the anti-icing system of a properly proportioned mixture of hot gases tapped from the inlet of the usual turbine, and relatively cool air bled from the compressor discharge, in order to promote efficient heating of the casing surfaces surrounding the air intake opening of a gas turbine power plant regardless of varying engine operating conditions.

Features of the invention include provision of a de-icing conduit system for the air intake section of a gas turbine power plant, and control valve means responsive to the joint operation of a thermostatic element and of a fluid pressure responsive element for supplying to the system varying portions of the hot gases from the turbine inlet of the power plant and of relatively cool air from the compressor discharge outlet, for ensuring flow of a gas mixture of constant pressure and temperature, irrespective of changing pressures and temperatures at the compressor outlet and turbine inlet.

These and other objects are effected by the invention as will be apparent from the following description and claims taken in connection with the accompanying drawings, forming a part of this application, in which:

Figure 1:
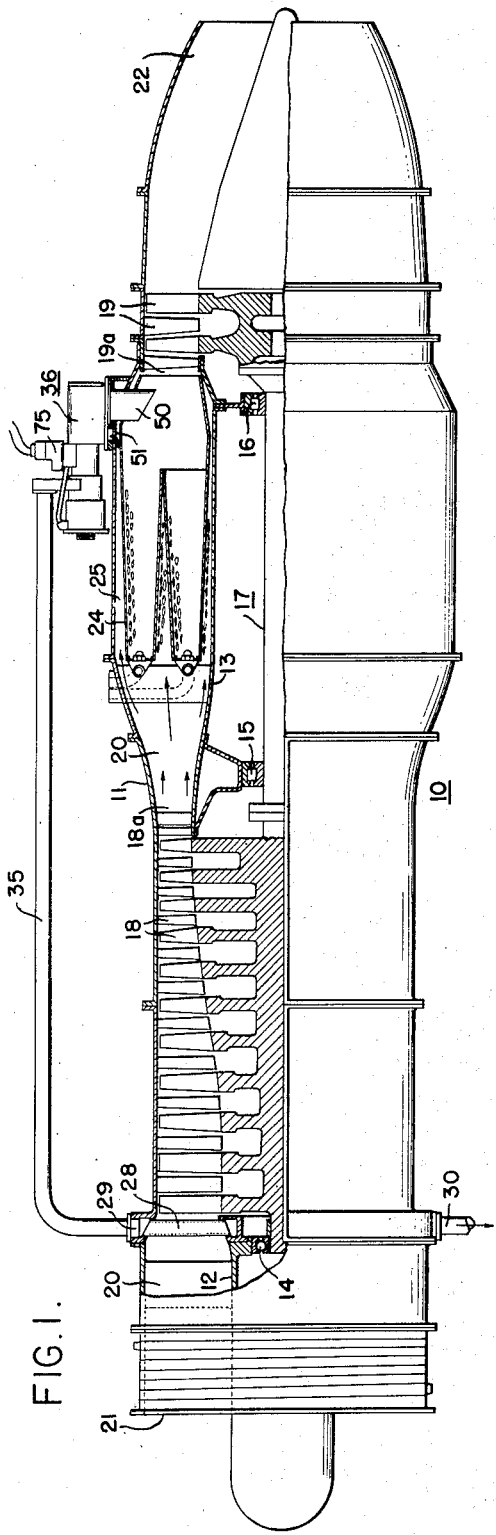
Fig. 1 is a diagrammatic, partially sectional view of a typical aviation gas turbine power plant equipped with anti-icing apparatus constructed in accordance with the invention.
Figure 2:
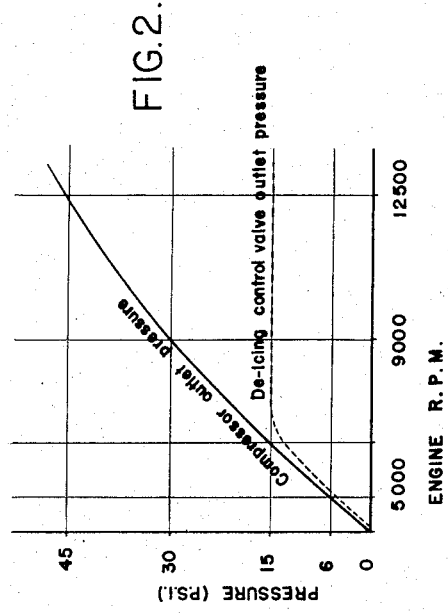
Fig. 2 is a graphic representation illustrating the approximate ideal relationship of anti-icing gas pressure and engine pressure incident to operation of the apparatus shown in Fig. 1.
Figure 4:
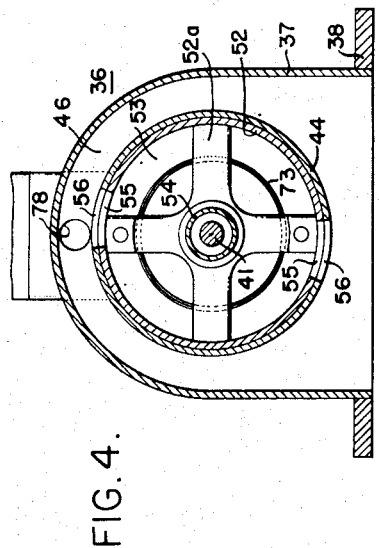
Fig. 4 is a sectional view taken along the line IV—IV of Fig. 3.

Referring to Fig. 1 of the drawings, a typical gas turbine engine 10 may comprise generally cylindrical outer casing structure 11 having axially mounted therein core sections 12 and 13 which support bearings 14, 15 and 16, and a rotor aggregate 17 journaled in the bearings for providing the rotary elements of an axial-flow compressor 18 and driving turbine 19. Formed longitudinally within the engine 10 is an annular passage 20 providing a fluid flow communication which extends from a frontal air intake opening 21 through the compressor 18 and turbine 19 to a rearwardly directed jet nozzle 22. Annular combustion apparatus 24 is interposed in the passage 20 between the outlet 18a of the compressor and the inlet 19a of the turbine, and is spaced from the casing 11 to form an annular cooling air passage 25. In operation, air entering the inlet opening 21 is compressed by the compressor 18 and delivered to the combustion apparatus 24, where fuel is burned to create motive gases which, together with the cooling air from passage 25, are expanded through the turbine 19 and then expelled by way of the nozzle 22 to establish a propulsive thrust.

Extending radially across the passage 20 upstream of the compressor 18 are a number of interconnected hollow anti-icing guide vanes 28, hereinafter referred to as anti-icing apparatus 28, having a common inlet 29 and a common discharge 30 and adapted to receive heated fluid for preventing accumulation of ice on the surfaces of the engine assembly which are exposed to the cold stream of air entering the air intake opening 21 during flight operation of the power plant. According to the invention, heated gases are supplied from the engine 10 to the anti-icing vanes 28 thereof by way of a conduit 35 and under the control of an anti-icing control valve device 36, which is suitably mounted on the portion of the casing structure 11 outwardly of the combustion apparatus 24.

Figure 3:
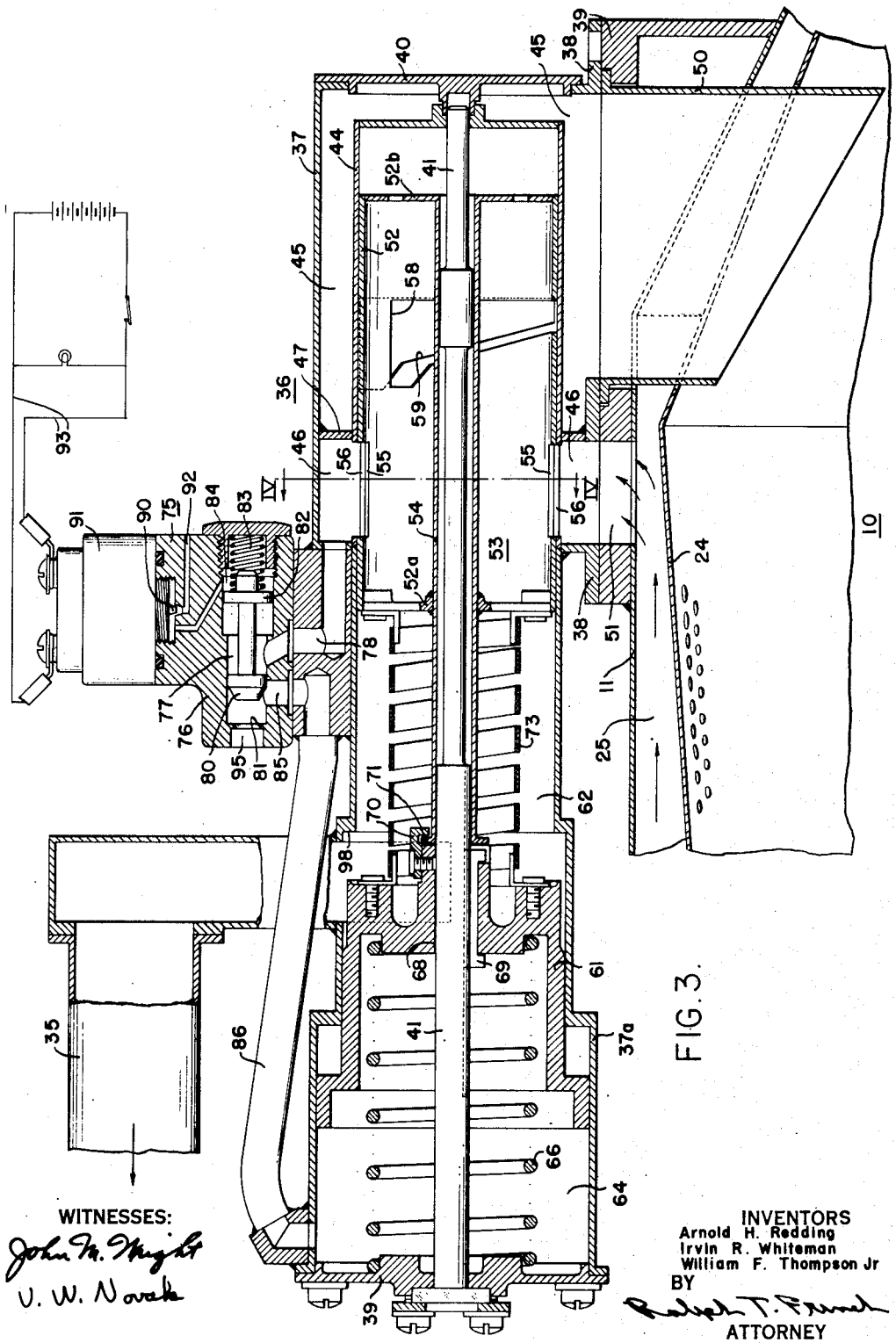
Fig. 3 is a fragmentary enlarged detail sectional view of the anti-icing control valve device shown in Fig. 1.

As best shown in Fig. 3 of the drawings, the control valve device 36 comprises a cylindrical casing 37 which carries a mounting flange 38 that is adapted to be bolted or otherwise secured to a complementary bolting face 39 provided on the casing structure 11 of the engine 10, adjacent the downstream end of the combustion apparatus 24. End plates 39 and 40 close the opposite ends of casing 37, and support therein a stationary axially disposed rod 41. Secured coaxially in the end of the casing 37 adjacent end plate 40 is a stationary sleeve 44 having formed outwardly thereof an annular gas chamber 45 and an annular air chamber 46, which are separated by an annular wall 47 extending between the sleeve 44 and the casing 37. The gas chamber 45 communicates with the downstream end of the combustion apparatus 24, and thus in effect with the turbine inlet, by way of a tubular probe 50, which extends through suitable openings formed in the engine casing structure 11 and in the combustion apparatus. The annular chamber 46 communicates with the cooling air passage 25 by way of an opening 51 formed in the casing structure 11. Slidably mounted in the sleeve 44 is a rotatable and axially movable cylindrical valve element 52 having an interior chamber 53 and supported through apertured end portions 52a and 52b by an axially extending tubular operating rod 54, which is slidably engaged on the stationary rod 41. One or more cooling air ports 55, shown as two in number in the present disclosure, are formed in the valve element 52 for movement into and out of registration with similar ports 56 formed in the stationary sleeve 44, for controlling communication between the chamber 46 and chamber 53. Communication from the chamber 45 to chamber 53 is likewise controlled by means of one or more suitably contoured ports 58, which are formed in the valve element 52 and adapted to register with corresponding ports 59 formed in the stationary sleeve 44. It will be understood that, in the operation of the control valve device 36, as hereinafter more fully explained, the valve element 52 will be operated to vary the flow areas of the respective pairs of ports 55 and 56, and 58 and 59, as best illustrated diagrammatically in Figs. 5 to 8 of the drawings.

The control valve device 36 further comprises a piston 61 which is operatively mounted in a suitable bore formed in an enlarged end 37a of the casing, and which is interposed between a spring chamber 64 and a chamber 62 communicating with the chamber 53 in valve element 52, and also with the conduit 35 leading to the anti-icing apparatus 28 in the compressor inlet as shown in Fig. 1. A coil spring 66 is interposed in chamber 64 between the end plate 39 and the piston 61 for urging the latter inwardly or toward the right, as viewed in Fig. 3. The piston has a central bore 68 for slidably receiving the stationary rod 41, along which the piston is movable longitudinally. A key 69 is inserted in suitable grooves in the rod and in piston 61 for preventing rotation of the latter.

The valve element 52 is operatively connected to the piston 61, for longitudinal movement thereby, through the medium of a collar 70 carried by the piston and engageable with a shoulder 71 formed on the operating rod 54. The valve element 52 is also adapted for rotation relative to the piston 61 and irrespective of longitudinal motion thereof, by operation of a helical bimetallic thermoresponsive element 73, the opposite ends of which are secured, respectively, to the end 52a of the valve element and to the piston. The thermoresponsive element 73 is adapted to wind or unwind in accordance with variations in temperature of gases in the chamber 62, thereby turning the valve element 52 relative to the piston 61, which is prevented from rotating by key 69.

For cutting the control valve device 36 in and out of operation at will, a suitable electroresponsive valve device 75 may be provided, comprising a casing 76 having a valve chamber 77 which communicates through a passage 78 with the chamber 46. The valve chamber 77 contains a vent valve element 80 engageable with a seat 81 and having a stem terminating in a piston 82. A spring 83 is disposed in a chamber 84 for urging the valve element toward the seat 81. With the valve element 80 in seated position, communication is maintained from the chamber 46 to the chamber 64 through the passage 78, chamber 77, a port 85 and a conduit 86. The piston 82 is made to fit in the chamber 77 with sufficient clearance to permit normal equalization of fluid pressure in the spring chamber 84 with the pressure in chamber 77. A normally closed vent valve element 90 and actuating electromagnet 91 therefor are provided for establishing a vent communication from chamber 84 to the atmosphere by way of a passage 92, upon energization of the magnet by a suitable magnet control circuit 93, when it is desired to effect operation of the piston 82 to overcome the force of spring 83 and to unseat valve element 80 for thereby opening an exhaust port 95 and reducing the pressure of air in chamber 64.

It will be understood that when the engine 10 is operated under favorable atmospheric conditions not likely to cause accumulation of ice on surfaces adjacent the air intake opening 21 (see Fig. 1), the circuit 93 will be deenergized and the elements of the anti-icing control valve device thus maintained in inoperative position. In the inoperative position of the device, with the valve element 80 engaging seat 81, the fluid pressures in chambers 62 and 64 will be equalized, as hereinbefore explained, so that spring 66 will hold piston 61 in engagement with an annular sealing surface 98 to cut off communication between the chamber 62 and the conduit 35. At the same time, the cylindrical valve element 52 will be disposed in a position as indicated in Fig. 5, in which the ports 59 and 58 provide sufficient flow areas to charge the various valve communications with gas under pressure from the combustion apparatus.

When air intake icing conditions are encountered, the circuit 93 is closed to effect operation of the magnet valve device 75 to vent the chamber 64, as already explained, whereupon the gas pressure in chamber 62 shifts the piston 61 and valve element 52 to the left, as viewed in Fig. 3, to establish gas flow through the conduit 35 to the de-icing apparatus 28, shown in Fig. 1. The engine pressure, as determined by operation of the power plant, will thus control the extent of axial movement of the valve element 52, while the temperature of gas flowing therethrough from the combustion apparatus 24 and passing over the thermoresponsive element 73 will effect more or less rotary displacement of the same valve element to vary the port areas thereof, in order to limit the pressure of gas supplied to the anti-icing apparatus to about 15 p. s. i., while limiting the temperature thereof to values ranging between 600° and 700° F.

Figure 5:
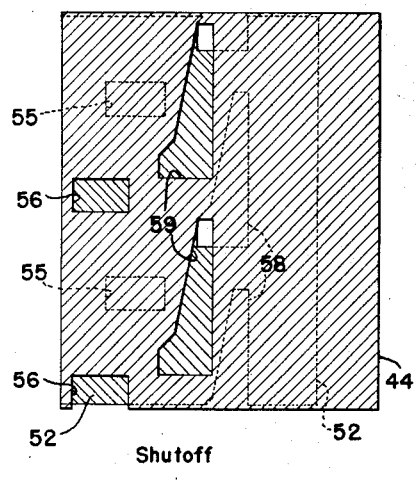
Figs. 5, 6, 7 and 8 are diagrammatic developmental views illustrating different positions of the valve elements of the valve device shown in Fig. 3.
Figure 6:
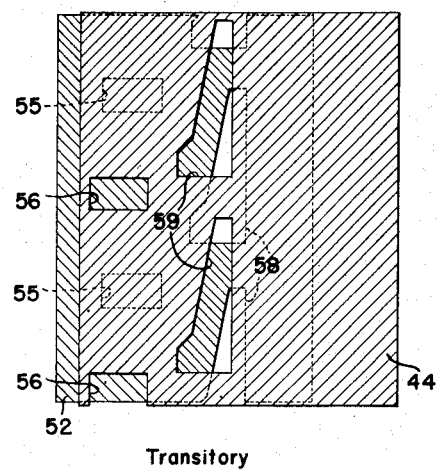

In Fig. 6, for example, a transitory or intermediate position of the valve element 52 is illustrated diagrammatically, whereby flow areas provided by the hot gas ports 59 and 58 are larger than those shown in Fig. 5.

Figure 7:
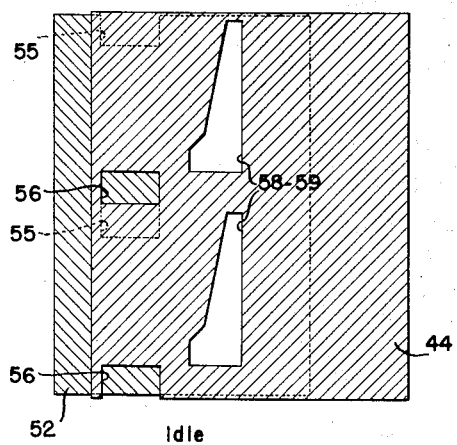

When the engine operating conditions call for supply by the de-icing apparatus of a maximum available flow of hot gases, as when the power plant is idling or cruising at high altitude and on a minimum fuel supply in an atmosphere conducive to ice accumulation, the valve position illustrated in Fig. 7 may be established.

Figure 8:
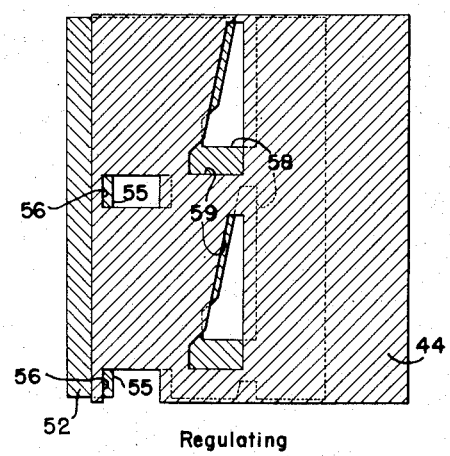

Upon development of another engine operating condition accompanied by a fuel supply rate causing excessive gas temperature, however, the valve element 52 may be rotated to a regulating position such as that shown diagrammatically in Fig. 8, wherein the air ports 55 and 56 are registered to add relatively cool air from the passage 25 (see Fig. 3) to the hot gases supplied from the combustion chamber by way of ports 58 and 59, thus moderating the proportions of hot and cool gas in the resultant mixture to maintain the desired predetermined temperature in the de-icing system.

Summarizing, it will thus be seen that a de-icing control valve apparatus constructed in accordance with the invention may be rendered automatically operative at will and under varying engine pressure and temperature conditions to maintain properly controlled flow of a heated mixture of gas and air through the de-icing system for the air intake structure of an aviation gas-motivated power plant, and that the valve elements of the apparatus are constructed and arranged to impose predetermined limits in pressure and temperature of the de-icing mixture for avoiding more than an inconsequential heating of air entering the intake, while preventing undue energy losses incident to the necessary withdrawal of gases for de-icing from the operating components of the power plant.

While the invention has been shown in but one form, it will be obvious to those skilled in the art that it is not so limited, but is susceptible of various changes and modifications without departing from the spirit thereof.

What is claimed is:

1. In a power plant comprising casing structure having a forwardly directed air inlet, a compressor mounted in said casing structure for receiving the air entering said inlet, said compressor having a discharge outlet, a gas turbine having a motivating gas inlet and an exhaust outlet and operatively connected to said compressor, and combustion apparatus interposed between said compressor outlet and said turbine inlet, the combination therewith of a heating conduit extending through said casing structure adjacent said air inlet, a cold air communication connected to said compressor discharge outlet, a hot gas communication connected to said turbine inlet, valve means interposed between each of said cold air and hot gas communications and said heating conduit for proportioning the flow of mixed air and gas thereto to prevent formation of ice in said air inlet, thermostatic means responsive to the heat of gas and air supplied to said heating conduit and operatively connected to said valve means, a spring, a piston connected to said valve means and subject to the opposing pressures of said spring and of the mixed air and gas in said heating conduit, and other valve means operable to supply air under pressure from said compressor outlet to said piston for effecting closure of the first-named valve means.

2. In a power plant comprising casing structure having a forwardly directed air inlet, a compressor mounted in said casing structure for receiving the air entering said inlet, said compressor having a discharge outlet, a gas turbine having a motivating gas inlet and an exhaust outlet and operatively connected to said compressor, and combustion apparatus interposed between said compressor outlet and said turbine inlet, the combination therewith of a heating conduit extending through said casing structure adjacent said air inlet, a cold air communication connected to said compressor discharge outlet, a hot gas communication connected to said turbine inlet, longitudinal sleeve means forming a chamber connecting said heating conduit and both said communications, rotatable and longitudinally movable valve means interposed in said sleeve means between each of said cold air and hot gas communications and said heating conduit for controlling the flow of mixed air and gas thereto, a spring, a piston subject to the opposing pressures of said spring and the air and gas in said heating conduit for moving said valve means longitudinally, and temperature - responsive means comprising a helical bimetal element interposed between said piston and said valve means in the path of such air and gas mixture for actuating said valve means in a rotary direction to effect proportioning of cold air and hot gas to maintain flow of the mixture through said conduit at a predetermined temperature.

3. In a power plant comprising casing structure having a forwardly directed air inlet, a compressor mounted in said casing structure for receiving the air entering said inlet, said compressor having a discharge outlet, a gas turbine having a motivating gas inlet and an exhaust outlet and operatively connected to said compressor, and combustion apparatus interposed between said compressor outlet and said turbine inlet, the combination therewith of a heating conduit extending through said casing structure adjacent said air inlet, a cold air communication connected to said compressor discharge outlet, a hot gas communication connected to said turbine inlet, longitudinal sleeve means forming a chamber connecting said heating conduit and said communications, valve means interposed in said sleeve means between said heating conduit and each of said cold air and hot gas communications for controlling the flow of mixed air and gas to said conduit, said valve means comprising a cylindrical slide valve element having ports variable in area both upon rotation and longitudinal movement thereof, relative to said sleeve means, and means for controlling operation of said valve means including a rotary temperature-responsive element interposed in the path of air and gas flowing to said heating conduit and a longitudinally movable fluid pressure-responsive element responsive to variations in the pressure of air and gas in said conduit, said elements being cooperative with said valve means to effect supply of a mixture of air and gas to said heating conduit at predetermined temperature and pressure for preventing formation of ice on said casing structure adjacent said air inlet for the compressor.

4. De-icing apparatus for a gas turbine power plant having an air intake portion, comprising a de-icing system for circulating heating fluid through said intake portion, a valve casing having a longitudinal chamber connected thereto, a helical thermostatic element adapted to exert a torque according to temperature of fluid in said chamber, a fluid pressure-responsive element longitudinally slidable in said chamber, cooling air and hot gas supply passages formed in said power plant and communicating with said chamber, and de-icing control valve means including an axially shiftable and rotatable cylindrical slide valve element having ports variable in area in accordance with both axial and rotary movement, said valve element being interposed in said chamber between said supply passages and said system and responsive to joint operation of said thermostatic and pressure-responsive elements for controlling supply to said system of an air and gas mixture of limited pressure and temperature irrespective of changing power plant pressure and temperature under varying operating conditions.

5. De-icing apparatus for a gas turbine power plant having an air intake portion, comprising a de-icing system for circulating heating fluid through said intake portion, cooling air and hot gas supply passages formed in said power plant, a casing having passages connected to said system and to said air and gas supply passages, a thermostatic element in said casing responsive to temperature changes in gas in said hot gas supply passage, a spring, a fluid pressure-responsive piston element in said casing interposed between and subject to opposing pressures of said spring and fluid supplied to said system, and de-icing control valve means comprising a hollow cylindrical slide valve element interposed in said casing between said supply passages and said system and operatively connected to said thermostatic and piston elements, said valve element being responsive to joint operation of said thermostatic and pressure-responsive elements for controlling supply to said system of an air and gas mixture of limited pressure and temperature irrespective of changing power plant pressure and temperature under varying operating conditions.

6. Deicing apparatus for controlling the supply of heating fluid to a heating conduit comprising a cool air source; a hot gas source; a casing forming, in longitudinal alignment, a piston chamber, a mixing chamber communicating with said heating conduit, an air chamber communicating with said cool air source and a gas chamber communicating with said hot gas source; valve means forming a plurality of ports connecting said air chamber and said gas chamber to said mixing chamber and including a rotatable and longitudinally movable valve element adapted to vary the flow areas of said ports selectively; a longitudinally movable piston interposed between said piston chamber and said mixing chamber; a spring biasing said piston against the pressure of heating fluid in said mixing chamber; and a helical thermostatic element disposed in said mixing chamber and having opposite ends secured to said piston and valve element, respectively; said valve element being movable longitudinally by said piston and rotatable by said thermostatic element to control the flow to said heating conduit of a proportioned mixture of cool air and hot gas which is limited in pressure and temperature.

7. Apparatus as set forth in claim 6 characterized by provision of an annular sealing surface engageable by the piston for cutting off communication from the mixing chamber to the heating conduit, and means operable to supply air under pressure from the cool air source to the piston chamber for moving the piston into engagement with said sealing surface.

ARNOLD H. REDDING.
IRVIN R. WHITEMAN.
WILLIAM F. THOMPSON, Jr.,

References Cited in the file of this patent

UNITED STATES PATENTS

| Number | Name | Date |
| --- | --- | --- |
| 1,924,122 | Jones | Aug. 29, 1933 |
| 2,404,275 | Clark et al. | July 16, 1946 |
| 2,469,375 | Flagle | May 10, 1949 |
| 2,507,044 | Palmatier | May 9, 1950 |
| 2,578,478 | Janes | Dec. 11, 1951 |